F. LAMBERT.
Watch and Clock Pinions.
No. 217,291. Patented July 8, 1879.
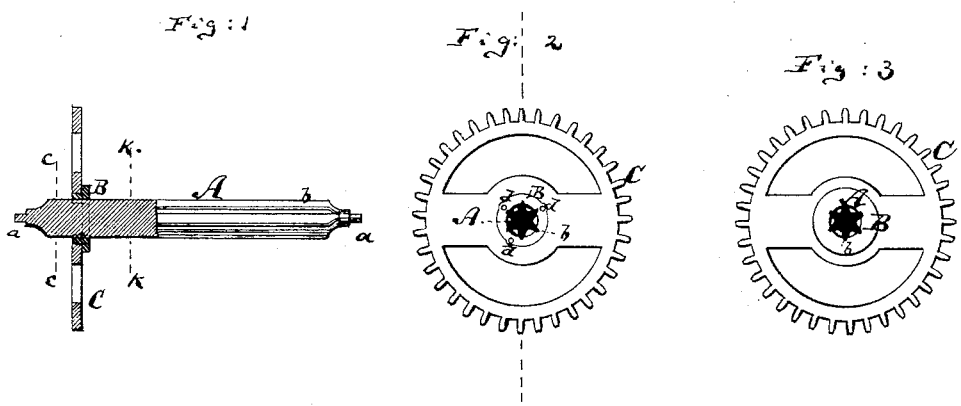

UNITED STATES PATENT OFFICE.

FRANÇOIS LAMBERT, OF ANSONIA, CONNECTICUT.

IMPROVEMENT IN WATCH AND CLOCK PINIONS.

Specification forming part of Letters Patent No. 217,291, dated July 8, 1879; application filed April 28, 1879.

*To all whom it may concern:*

Be it known that I, FRANÇOIS LAMBERT, of Ansonia, in the county of New Haven and State of Connecticut, have invented a new and useful Improvement in Watch and Clock Pinions, of which the following is a specification.

Figure 1 is a longitudinal central section of my improved pinion. Fig. 2 is a cross-section thereof on the line $c\ c$, Fig. 1; Fig. 3, a cross-section thereof on line $k\ k$, Fig. 1.

Similar letters of reference indicate corresponding parts in all the figures.

This invention relates to a new construction of pinions and toothed wheels for clocks and watches.

My invention consists in constructing nearly the entire length of arbor with projecting ribs and intermediate grooves, so that every part thereof may serve as a pinion, (but the ends of the toothed arbor are formed into rounded gudgeons,) and in driving a collar or washer upon the toothed shaft, and in thereupon securing the toothed wheel to said collar, the teeth of the arbor cutting into the metal of the collar, holding it securely in place.

In the drawings, the letter A represents my improved arbor-pinion; B, the collar or washer placed thereon, and C the toothed wheel secured to the collar.

The arbor A is made of a bar of steel, shaped in cross-section to form ribs and grooves, as is proper for a watch or clock pinion, and as clearly shown in Figs. 2 and 3. The bar thus formed is cut into suitable lengths for the several arbors, and the gudgeons $a\ a$ are then turned at the ends in suitable manner, so that the arbor can be properly hung in the frame. I prefer to make the arbor-pinion A of steel or other hard metal.

The collar B, which is usually made of brass or other comparatively soft metal, has an inner bore somewhat smaller in diameter than the outermost diameter of the arbor-pinion. The collar is best secured in place by simply driving it upon the arbor-pinion to the requisite distance, the teeth $b\ b$ of the arbor-pinion cutting into the body of the collar and holding it in place, so that it cannot turn loose.

The wheel C is finally secured to the collar in the usual manner, either by forming dents $d\ d$ in the collar or otherwise.

The wheels, being made of thin metal, would lose their form if driven directly upon the toothed arbors. The collar permits, moreover, the perfect centering of each wheel.

I claim—

1. The combination of the arbor-pinion A with the collar or wheel-carrying disk B, which is held fast by the teeth of the pinion and with the body of the wheel C, which is fastened to the collar, substantially as herein shown and described.

2. The method herein described of securing toothed clock or watch wheels to their arbors and pinions by driving the carrying-collars over the teeth of the pinions and securing the wheels to the faces of said collars, substantially as herein shown and described.

FRANÇOIS LAMBERT.

Witnesses:
T. B. MOSHER,
W. H. C. SMITH.